March 17, 1959 H. C. GOODRICH 2,878,312

NOISE IMMUNE AUTOMATIC GAIN CONTROL CIRCUIT

Filed Nov. 29, 1954 2 Sheets-Sheet 1

INVENTOR.
HUNTER C. GOODRICH

BY H. [signature]

ATTORNEY

March 17, 1959 H. C. GOODRICH 2,878,312

NOISE IMMUNE AUTOMATIC GAIN CONTROL CIRCUIT

Filed Nov. 29, 1954 2 Sheets-Sheet 2

INVENTOR.
HUNTER C. GOODRICH
BY
ATTORNEY

United States Patent Office 2,878,312

Patented Mar. 17, 1959

2,878,312

NOISE IMMUNE AUTOMATIC GAIN CONTROL CIRCUIT

Hunter C. Goodrich, Collingswood, N. J., assignor to Radio Corporation of America, a corporation of Delaware Application November 29, 1954, Serial No. 471,800

12 Claims. (Cl. 178—7.3)

The present invention relates generally to automatic gain control circuits and particularly to automatic gain control circuits employing semiconductor signal translating devices.

It has long been the practice to provide radio receiving systems with an automatic gain control (AGC) circuit to automatically adjust the gain of the receiving system as an inverse function of the received signal carrier amplitude. In amplitude modulated sound broadcast radio signal receiving systems this AGC action may be accomplished on the basis of average carrier amplitude since the modulation is substantially symmetrical with respect to an average zero modulation signal level.

In television signal receiving systems, however, the problem is known to be complicated by the fact that the average carrier level, as detected in the receiver, varies as a function of both the received signal amplitude and the direct current component or brightness component of the scene being televised. It is, therefore, necessary to provide an AGC voltage developing circuit which is responsive only to a datum portion of the television signal. This datum portion is usually taken as the peak excursion of the synchronizing pulses which are transmitted as a predetermined percentage of modulation.

Since the synchronizing signal portion of the signal comprises the peak excursions of the composite television wave-form, it has become common practice to combine the function of synchronizing signal separation in the receiver with that of developing an AGC potential. It is generally desirable in separating the synchronizing signal component from the composite television signal to effectively double clip the synchronizing signal component. The first clipping action is accomplished at a level slightly above blanking whereby to eliminate blanking and video information from the separated synchronizing signal information. The second aspect of the double clipping action deals with a level slightly below the synchronizing signal peak amplitude whereby to eliminate noise impulse signals having an amplitude in excess of the synchronizing signal pulses.

Aside from adequate gain and freedom from blocking, the most important characteristic of an AGC circuit is its performance in the presence of impulse noise. Impulse noise may, through an apparent increase in the peak signal amplitude, result in a loss of video information and may, through blocking of the synchronizing separator system, result in a disturbance in or a loss of synchronizing information.

The apparent increase in peak signal may result in an increase in the AGC bias thus reducing the gain in the receiving system which reduces the amplitude of the video signal applied to the video amplifier section and thus reduces the noise clipping effectiveness of the synchronizing separator circuits. This action is called noise "set up." This deleterious effect can best be avoided by providing an AGC circuit which will establish a reduced AGC bias or "set down" in the presence of impulse noise.

It is accordingly an object of the present invention to provide an improved automatic gain control circuit for signal amplifying systems and the like, effectively utilizing semiconductor devices for developing a reduced bias in the presence of impulse noise.

It is a further object of the present invention to provide a semiconductor automatic gain control circuit effectively utilizing semiconductor devices and which renders a radio receiving system in which it is incorporated, substantially immune to impulse noise.

It is another object of the present invention to provide an improved semiconductor signal processing circuit for television receiving systems and the like, which provides both double clipping of a received synchronizing signal, as well as an automatic gain control bias which is substantially immune to impulse noise.

In accordance with the present invention, a time constant network having a short time constant relative to the repetition rate of the synchronizing signal is connected in common in the output circuit of the synchronization signal separator circuit and the base-emitter path of an automatic gain control amplifier stage. The automatic gain control amplifier stage is initially cut-off by application of an impulse noise signal but the automatic gain control bias level is rapidly corrected to a high gain condition due to the rapid discharge of the network. The associated synchronization signal separator circuit remains blocked due to the action of a resistance-capacitance network selected for synchronization signal separation but the repair time is not sufficiently long to impair synchronization.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
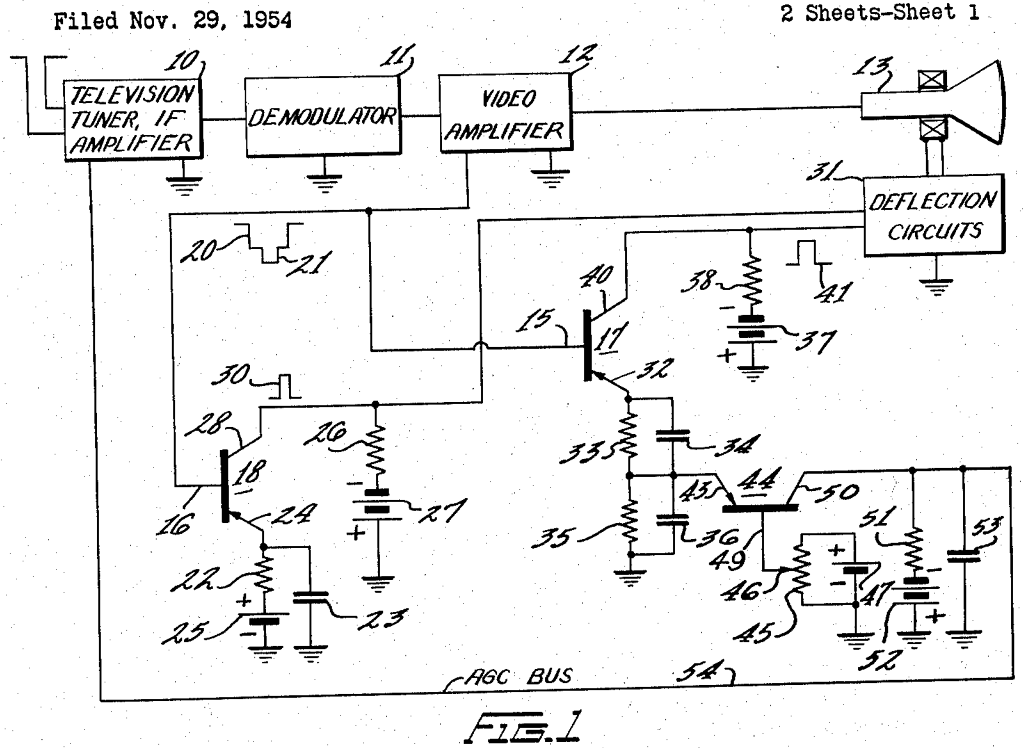
Figure 1 is a schematic circuit diagram, partly in block form, of a television receiving system employing a synchronization signal separator circuit and an automatic gain control circuit, illustrating one embodiment of the present invention.

Referring now to the drawing, wherein like reference characters are utilized to designate like elements throughout the various figures, and referring particularly to Figure 1, a conventional television signal receiving system is provided for receiving and demodulating a transmitted television carrier wave. The system may comprise, as the legend indicates, a television tuner and intermediate frequency signal amplifier portion 10 for initially processing the received carrier wave, and a demodulator portion 11 whereby the composite video signal is recovered from the carrier wave. The composite video signal is coupled in the usual manner to a conventional video amplifier 12 which is provided for further amplification of the video signal and which is coupled with a kinescope 13 to develop an image of the televised object.

The composite video signal will be understood to include horizontal and vertical synchronizing pulses superimposed at predetermined intervals upon the blanking pulses for maintaining synchronous operation of the receiver deflection apparatus with that of the transmitter. Accordingly, an output signal is derived from the video amplifier 12 and applied to the base or input electrodes 15 and 16 of a pair of semiconductor devices illustrated as junction transistors 17 and 18 of the PNP variety and utilized in vertical and horizontal synchronizing signal separator circuits respectively. The signal which is applied to the base electrodes 15 and 16 is illustrated for the purpose of simplicity as a waveform 20 comprising a blanking pulse having superimposed thereon a synchronizing pulse 21.

The horizontal synchronization signal separator circuit includes a time constant network comprising a resistor 22 and a capacitor 23 connected in parallel arrangement between the emitter electrode 24 of the transistor 18 and a point of fixed reference potential or signal ground. The capacitance of the capacitor 23 and the resistance of the resistor 22 are chosen to provide a time constant which is long compared to a cycle of the horizontal synchronizing rate thereby providing a threshold level automatically adjustable by the level of the input signal. Initial steady state bias to establish a static threshold is provided by a source of bias, illustrated as a battery 25, connected between one end of the emitter resistor 22 and signal ground. This static bias is poled in such a direction as to provide a forward bias between the emitter electrode 24 and the base electrode 16, however, this tends to cause current flow in the transistor 18 which develops a voltage of opposite polarity across the emitter resistor 22 until an operating point is reached whereby signal current flows only on synchronizing signal peak excursions.

The load impedance for the horizontal synchronizing signal separator comprises a collector resistor 26 connected in series with a second source of bias, illustrated as a battery 27 between the collector electrode 28 and signal ground.

Accordingly, an output signal is derived from the collector electrode 28 in the form of double clipping horizontal synchronizing pulses, as illustrated by the waveform 30, which are applied to the deflection circuits 31 to effect synchronization thereof.

The vertical synchronizing signal separator circuit, in accordance with the present invention, comprises a double time constant network in the emitter electrode circuit of the transistor 17 to provide automatic threshold level adjustment and an AGC "set down" action. The first time constant network includes the parallel arrangement of a resistor 33 and a capacitor 34 chosen to provide a time constant long compared to a cycle of the vertical synchronizing signal rate. The second time constant circuit includes the parallel arrangement of a resistor 35 and a capacitor 36 chosen to provide a time constant which is short relative the time required for one cycle of the vertical synchronizing signal. A load impedance and energizing bias is provided by a load resistor 38 connected in series arrangement with a battery 37 between the collector electrode 40 and signal ground.

Vertical synchronizing signals in the nature of a double clipped pulse as illustrated by the waveform 41 are derived from the collector electrode 40 and applied to the deflection circuit 31 to synchronize the operation thereof with the deflection circuits at the transmitter.

An AGC voltage is derived from the junction of the two time constant networks to which is connected the input or emitter electrode 43 of a semiconductor device, illustrated as a PNP junction transistor 44 employed as an AGC signal amplifier. A voltage divider arrangement, illustrated as a potentiometer 45 having a variable tap 46 is connected in shunt with a source of direct current bias, illustrated as a battery 47 to provide an adjustable static bias between the base electrode 49 and the emitter electrode 43. The tap 46 may be readily adjusted to establish the desired level at which the AGC amplifier provides a signal actuated control voltage at the output or collector electrode 50. The amplified AGC voltage may be derived across a load impedance element, illustrated as a resistor 51, connected in series with a source of direct current bias, illustrated as a battery 52 between the collector electrode 50 and signal ground. Variations in the output signal are integrated by the filter capacitor 53 connected between the AGC bus 54 and signal ground. The resulting AGC voltage is accordingly applied to gain control elements in television tuner and intermediate frequency amplifier portions of the receiving system to provide a system gain which is an inverse function of the received carrier amplitude.

Figure 2:
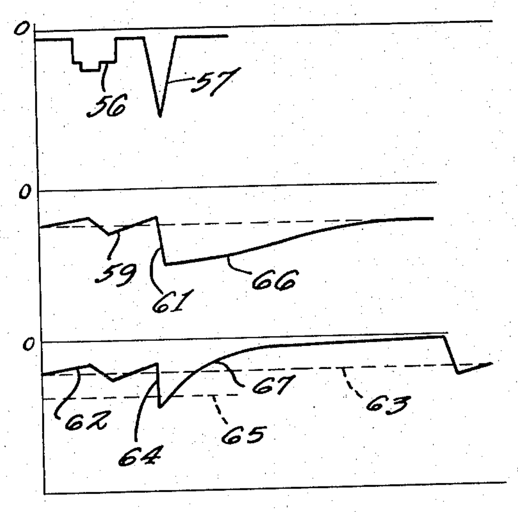
Figure 2 is a graph showing curves illustrating the waveforms appearing at selected points in the system shown in Figure 1.

The detailed operation of the "set down" action of the above described circuit may be best understood by reference to the curves shown in the graph of Figure 2, wherein the ordinate represents relative voltage and the abscissa represents time. A curve 56 illustrates, in simplified form, a received signal containing a sharp pulse 57 representing impulse noise. This curve may represent the signal wave derived from the video amplifier 12 and applied to the base electrodes 15 and 16.

The effect of this signal voltage upon the vertical synchronizing signal separator circuit is illustrated by a curve 59 depicting the voltage appearing across the capacitor 34. The horizontal reference line indicated by "0" at the ordinate is signal ground, and the dashed horizontal line 60 illustrates the average voltage across the capacitor 34 under normal signal conditions.

It is seen, however, that the effect of the noise pulse is to drive the transistor 17 into a high current conducting state thereby providing a large emitter electrode current. The emitter electrode current flow through the series resistors 33 and 35 will drive the emitter electrode highly negative as shown by the fast rise time portion 61 of the curve 59.

The signal voltage appearing across the second time constant network is depicted by the curve 62 with the dashed horizontal curve 63 representing the average signal applied to the emitter electrode 43 under normal signal conditions. It is seen that the effect of the noise impulse is to instantaneously provide a sharp increase in this signal level as shown by the fast rise time portion 64 of the curve 62. However, the amplitude of this increased signal is limited due to cut-off of the transistor 44 at a level shown by the straight line dashed curve 65.

As was above described, the time constant provided by the combination of the resistor 33 and the capacitor 34 is long relative to the repetition rate of the horizontal synchronizing rate and the time constant provided by the combination of the resistor 35 and the capacitor 36 is relatively short. Accordingly, the discharge time for the first time constant network is long as shown by the positive going portion 66 of the curve 59 thereby maintaining the transistor 17 in a cut-off condition for an appreciable time. The second time constant network which is connected between the input and common or emitter and base electrodes 43 and 49 of the AGC amplifier transistor 44 discharges rapidly as shown by the positive going portion 67 of the curve 62, and since the emitter electrode current of the synchronizing signal separator transistor 17 is held to a minimum due to the action of the first time constant network, the AGC signal input falls rapidly approaching 0 as shown.

The resultant AGC voltage appearing on the AGC bus 54 is therefore appreciably lower than average thereby affecting an increased gain in the receiving system. It is seen that the system provided in accordance with the present invention is effective to provide a reduced receiver gain for a very short time and rapidly returns to a high gain condition of noise "set down" due to the combined action of the two time constant networks. As further illustrated by the curves 59 and 62, the circuit is moreover returned to a condition of normal AGC action upon the complete discharge of the first time constant network. The discharge time of the first time constant is not sufficiently long to impair vertical synchronization of the deflection circuits thereby providing stable operation of all associated circuitry.

Figure 3:
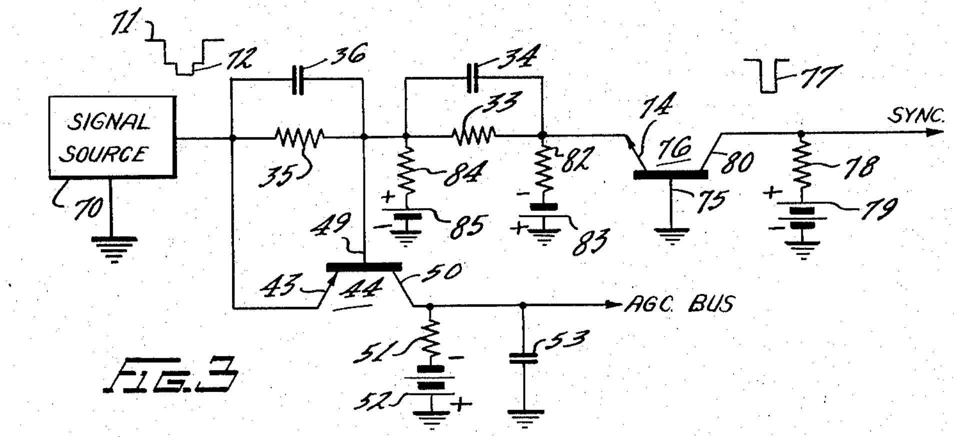
Figure 3 is a schematic circuit diagram, partly in block form, of a further embodiment of a synchronizing signal separator circuit and automatic gain control circuit in accordance with the present invention.

It is also within the scope of the present invention to provide a noise "set down" circuit in combination with a synchronizing signal separator circuit utilizing a semiconductor device in a common base configuration as illustrated in Figure 3 which shows only the vertical synchronizing signal separator and AGC amplifier circuits in combination with a signal source 70 which may represent the video amplifier portion of the system shown in Figure 1. The waveform 71, therefore, represents a blanking pulse upon which is superimposed a vertical synchronizing pulse 72 and depicts a simplified version of the output signal derived from the signal source 70.

This output signal is applied between the input or emitter electrode 74 and the common or base electrode 75 of a semiconductor device, illustrated as a NPN junction transistor 76, through the two time constant networks. A double clipping vertical synchronizing pulse, as shown by the waveform 77 may be derived across a load impedance element, illustrated as a resistor 78, connected in series with a source of direct current bias, illustrated as a battery 79, between the collector electrode 80 of the transistor 76 and signal ground. It is noted that there is no phase reversal between the input and output circuits of a common or grounded base transistor signal amplifier circuit and accordingly the input signal must be of the same polarity as that desired for the output signal.

An AGC signal is derived across the second time constant network as described in connection with Figure 1. Accordingly, the emitter and the base electrodes 43 and 49 of the AGC signal amplifier transistor 44 are connected to the end terminals of the second time constant network. The resultant amplified AGC voltage is derived across the AGC filter capacitor 53 and may be applied to the AGC bus in a television or other gain controlled receiving system.

A static bias to provide an amplifying threshold for the vertical synchronizing separator circuit is established by the bias network comprising a first bias resistor 82 connected in series arrangement with a bias battery 83 between the emitter electrode 74 and signal ground and a second bias resistor 84 connected in series with a bias battery 85 between signal ground and the junction of the two time constant networks. The bias batteries are poled in such a direction to establish a forward bias between the emitter and base electrodes 74 and 75. As is known, a forward bias is effective to affect conduction through the transistor 76 thereby resulting in emitter current flow through the resistor 33 providing a voltage drop thereacross of such a polarity to oppose the static forward bias. The transistor 76 is accordingly biased to provide signal translation for vertical synchronizing pulses which exceed a predetermined threshold, and moreover the threshold is automatically adjustable in accordance with the signal amplitude as the signal amplitude is effective to determine the average emitter electrode current.

The AGC "set down" effect described above in connection with Figure 1 is equally applicable here to establish a reduced AGC voltage for high receiver gain operation in the presence of impulse noise through the combined operation of the two time constant networks.

Figures 4, 5:
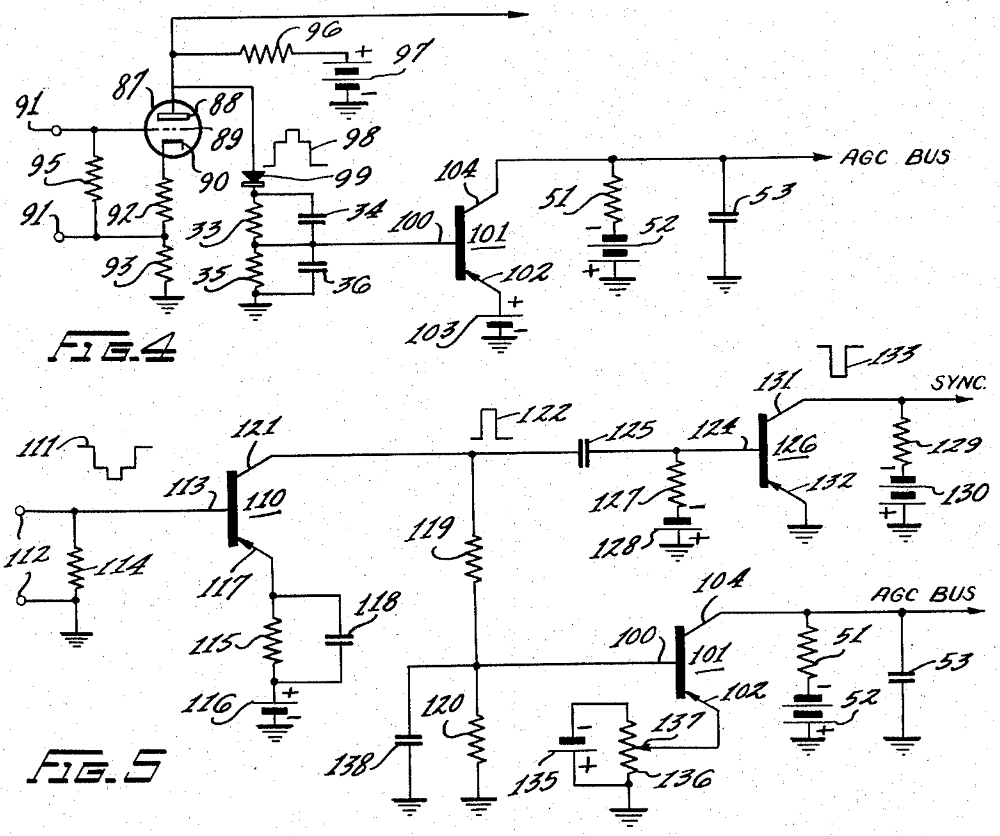
Figure 4 is a schematic circuit diagram of an automatic gain control circuit for a signal receiver or the like provided in accordance with the present invention; and, Figure 5 is a schematic circuit diagram of a combined synchronizing signal separator circuit and an automatic gain control circuit illustrating a still further embodiment of the present invention.

The fundamental concepts of the present invention also include the provision of a noise "set down" AGC circuit exclusive of synchronizing signal separation. This is shown in Figure 4 wherein an electron discharge device 87 having an anode 88, a control grid 89 and a cathode 90 may represent in general a signal amplifier device such as that used in a video amplifier stage. Input signal information may accordingly be applied from any convenient source to a pair of signal input terminals 91, one of which is connected directly to the control grid 89, the other of which is connected to the junction of a pair of cathode resistors 92 and 93. Bias is applied to the control grid 89 by means of a grid resistor 95 connected across the signal input terminals 91.

An amplified output signal may be derived across an anode load resistor 96 connected in series with a source of direct current energizing voltage, illustrated as a battery 97, between the anode 88 and signal ground. This output signal may, of course, be applied to subsequent signal translating stages as indicated by the signal bus and arrowhead leading from the anode 88.

In accordance with the present invention, the output signal which may be represented by the waveform 98 is applied to the series arrangement of a unilaterally conducting device 99 and a pair of time constant networks. The input or base electrode 100 of an AGC signal amplifier transistor 101 is connected to the junction of the two time constant networks. A static bias in the forward direction is provided between the emitter and base electrodes 102 and 100 by a source of direct current bias, illustrated as a battery 103 connected between the common or emitter electrode 102 and signal ground. The AGC signal amplifier transistor is thereby placed in a condition for decreased conduction upon receiving positive going signal information from the anode 88.

An amplified AGC voltage may, therefore, be derived from the collector electrode 104 across the AGC filter capacitor 53 and applied to the gain controlled stages of the system by an AGC bus.

A two stage vertical synchronizing signal separator circuit provided with a noise "set down" circuit in accordance with the present invention is illustrated in Figure 5. The first transistor 110 is illustrated as a junction transistor of the PNP variety. Input signals in the form illustrated by the waveform 111 may be applied from any convenient source, such as the video amplifier portion of a television receiving system, to a pair of signal input terminals 112, one of which is connected to the base electrode 113, the other of which is connected directly to signal ground. A static bias is provided by a base resistor 114 connected between the base electrode and signal ground and an emitter resistor 115 and a source of direct current bias, illustrated as a battery 116, connected in series arrangement between the emitter electrode 117 and signal ground. Emitter current flow through the emitter resistor 115 establishes a reverse bias between the emitter and base electrodes 113 and 117 except during the application of synchronizing signals. The threshold amplifying level is dynamically adjustable in accordance with the amplitude of the input signal due to the time constant network comprising a capacitor 118 connected in shunt with the emitter resistor 115.

A load circuit comprising the series arrangement of a pair of resistors 119 and 120 is connected between the collector electrode 121 and signal ground. The load circuit is selected to provide an amplified output signal in the nature of a positive pulse illustrated by the waveform 122 which is not limited so that the pulse amplitude applied to the base electrode 124 through the coupling capacitor 125 may vary in amplitude in accordance with variations in the amplitude of the input signal. The bias level to determine the amplifying threshold and consequently the separation level of the synchronizing signals is accordingly adjusted due to the emitter current flow as above described.

Further amplification and limiting of the synchronizing signals is accomplished by the second transistor 126 connected in a common emitter configuration. The load and bias characteristics of the second transistor 126 are selected to provide collector saturation on any usable signal by providing a fixed base bias by means of a base resistor 127 and a battery 128 connected in series arrangement between the base electrode 124 and signal ground and a load circuit comprising a load resistor 129 and a battery 130 connected in series arrangement between the collector electrode 131 and signal ground. The emitter electrode 132 is connected directly to signal ground; and since the bias conditions are selected to provide collector saturation on very weak signals, a double clipped synchronizing pulse in the nature of the waveform 133 is derived from the collector electrode 131.

An AGC signal is derived across the load resistor 120 and applied between the base and emitter electrodes 100 and 102 of the AGC signal amplifier transistor 101 to provide an amplified AGC voltage at the collector electrode 104. The AGC level and initial bias conditions are adjustable by means of a bias network comprising a battery 135 and a potentiometer 136 having an adjustable tap 137 connected to the emitter electrode 102.

Noise "set down" is accomplished in accordance with the present invention by providing a capacitor 138 in parallel with the load resistor 120 which in combination are selected to provide an appreciably smaller time constant than that provided by the combination of the emitter resistor 115 and the capacitor 118. A noise pulse, which is positive due to the phase reversal properties of the first synchronizing signal separator transistor 110, then drives the base electrode 100 positively providing an instantaneous increase in the AGC voltage appearing at the collector electrode 104. The magnitude of this effect is limited, however, since the AGC amplifier transistor 101 is driven beyond cut-off. A cut-off condition also appertains at the first synchronizing signal separator transistor 110 due to the noise pulse and the effect continues until the excess charge on the capacitor 118 is discharged through the emitter resistor 115.

Since the time constant of the load resistor 120 and the shunt capacitor 138 is appreciably less, the capacitor 138 discharges relatively rapidly thereby placing the AGC signal amplifier transistor 101 in a conductive condition. The reduced collector electrode current through the load resistor 120 results in higher than normal conduction by the AGC signal amplifier transistor 101 thereby developing a reduced AGC voltage and providing a high gain condition in the receiver system until the excess charge has leaked off the capacitor 118.

In this arrangement, it is preferred that the first synchronizing signal separator transistor 110 be operated without saturation so that the change in collector electrode current with varying input signal level is adequate to drive the AGC signal amplifier transistor 101 over the required range.

The various embodiments of the noise immune automatic gain control circuit provided by the present invention are thus effective to provide a reduced bias condition with consequent increased system gain in the presence of impulse noise. This is accomplished with a simple, efficient, reliable circuit configuration without imparing the normal operation of the AGC circuit or associated circuits.

What is claimed is:

1. An automatic gain control circuit for a signal receiving system subject to impulse noise comprising in combination: a first semiconductor device having base, emitter and collector electrodes; means providing a signal input circuit coupled with said device and adapted to provide an increased emitter electrode current flow with an increase in the input signal level; a first resistance-capacitance network connected to be traversed by said emitter current and having a predetermined time constant; a second resistance-capacitance network having a time constant appreciably shorter than said first network connected to be traversed by the collector electrode current flow through said device; a second semiconductor device having base, emitter and collector electrodes; means connecting said second network between the base and emitter electrodes of said second semiconductor device; and an automatic gain control voltage output circuit coupled with the collector electrode of said second semiconductor device.

2. An automatic gain control circuit for a signal receiving system subject to impulse noise comprising in combination: a first semiconductor device having base, emitter and collector electrodes; a signal input circuit coupled with said device and adapted to provide an increased emitter electrode current flow with an increase in the input signal level; a first resistor connected to be traversed by said emitter current; a first capacitor connected in shunt with said first resistor and providing in combination therewith a predetermined time constant; a second resistor connected to be traversed by the collector electrode current flow through said device; a second capacitor connected in shunt with said second resistor and providing in combination therewith a time constant shorter than said predetermined time constant; a second semiconductor device having base, emitter and collector electrodes; means connecting said second resistor between the base and emitter electrodes of said second semiconductor device; and an automatic gain control voltage output circuit coupled between the collector electrode and one of said base and emitter electrodes of said second semiconductor device.

3. An automatic gain control circuit comprising in combination: a first junction transistor having base, emitter and collector electrodes; a signal input circuit connected with said base electrode and adapted to provide an increased emitter electrode current flow with an increase in the input signal level; a first resistor connected in series with said emitter electrode; a first capacitor connected in parallel with said first resistor and providing in combination therewith a predetermined time constant; a second resistor connected in series with said collector electrode; a second capacitor connected in parallel with said second resistor and providing in combination therewith a time constant less than said predetermined time constant; a second semiconductor device having base, emitter and collector electrodes; the base and emitter electrodes of said second semiconductor device being connected directly across said second resistor; and an automatic gain control voltage output circuit connected between the collector electrode and one of said base and emitter electrodes of said second semiconductor device.

4. In a television signal receiving system subject to impulse noise including a first semiconductor device having base, emitter and collector electrodes connected in a synchronizing signal separator circuit including a first resistance-capacitance network having a predetermined time constant and connected to be traversed by the current flow in said emitter electrode, the combination comprising an automatic gain control circuit including a second semi-conductor device having base, emitter and collector electrodes; a second resistance-capacitance network connected between the base and emitter electrodes of said second semiconductor device and serially connected with said first network to be traversed by the current flow in the emitter electrode of said first device, whereby voltage across said networks occasioned by an increase in current flow in said emitter electrode in response to received impulse noise is discharged across said second network in an appreciably shorter time than across said first network; and an automatic gain control voltage output circuit coupled between the collector and base electrodes of said second semiconductor device.

5. An automatic gain control circuit for a signal receiving system subject to impulse noise comprising in combination: a first semiconductor device having base, emitter and collector electrodes; a signal input circuit coupled between said base and emitter electrodes; a first and a second resistance-capacitance network connected in series relation with said emitter electrode and adapted to be traversed by the current flow in said emitter electrode; a second semiconductor device including first, second and third electrodes; said first electrode being connected to the junction of said first and second resistance-capacitance networks, and said second electrode being connected with the end terminal of said second resistance-capacitance network; said first network having components selected to provide a time constant appreciably longer than the time constant provided by said second network; and an automatic gain control voltage output circuit coupled between said third electrode and one of said first and second electrodes, whereby impulse noise appearing in said input circuit affects a reduced gain control voltage in said output circuit.

6. An automatic gain control circuit for a signal receiving system comprising in combination: a first semiconductor device having base, emitter and collector electrodes; a signal input circuit coupled between said base electrode and signal ground; a first and a second resistance-capacitance network connected in series relation between said emitter electrode and said signal ground; each of said networks consisting of a resistor and a capacitor connected in parallel; a second semiconductor device including base, emitter and collector electrodes; said emitter electrode being connected to the junction of said first and second networks, and said base electrode being connected to said ground; said first network having components selected to provide a time constant appreciably longer than the time constant provided by said second network; and an automatic gain control voltage output circuit coupled between the collector and base electrodes of said second semiconductor device, whereby impulse noise appearing in said input circuit affects a reduced gain control voltage in said output circuit.

7. In a television receiving system including a first semiconductor device having base, emitter and collector electrodes and adapted as a synchronizing signal separator circuit, the combination comprising, a signal input circuit, a first and a second resistance-capacitance network connected in series relation between said input circuit and said emitter electrode, a second semiconductor device including base, emitter and collector electrodes, the base and emitter electrodes of said second device being connected across said second network, each of said networks including the parallel arrangement of a resistor and a capacitor, said second network providing a time constant appreciably shorter than that of said first network, and an automatic gain control voltage output circuit connected with the collector electrode of said second semiconductor device, whereby impulse noise appearing in said input circuit affects a reduced gain control voltage in said output circuit.

8. An automatic gain control circuit for signal receiving systems and the like subject to impulse noise comprising in combination: means providing a current subject to impulse noise variation; a first resistance-capacitance network having a predetermined time constant; a second resistance-capacitance network having a time constant appreciably shorter than said predetermined time constant; means connecting said current providing means and said first and second networks in series relation to provide current through said networks, a semi-conductor amplifier device having first, second and third electrodes; means connecting said second network between the first and second electrodes of said device for applying voltage across said second network between said electrodes; means providing an automatic gain control output circuit coupled with said third electrode for deriving an automatic gain control signal; and means for applying said automatic gain control signal to a receiving system to control the gain thereof.

9. An automatic gain control circuit for signal receiving systems and the like subject to impulse noise comprising in combination: a signal translating stage including an amplifying device having first, second and third electrodes, means connecting said device so that the current between said first and third electrodes is controlled by a signal applied between said first and second electrodes; a first resistance-capacitance network having a predetermined time constant; a second resistance-capacitance network having a time constant appreciably shorter than said predetermined time constant; means connecting the current path between said first and third electrodes and said first and second networks in series relation; a semiconductor amplifier device having base, emitter, and collector electrodes; means connecting said second network in series relation between the base and emitter electrodes of said device for applying the signal voltage across said second network between said base and emitter electrodes; means providing an automatic gain control output circuit coupled with said collector electrode for deriving an automatic gain control signal; and means for applying said automatic gain control signal to said receiving system to control the gain thereof.

10. An automatic gain control circuit for a signal receiving system subject to impulse noise comprising in combination: means providing a signal translating stage having a current path subject to control by impulse noise variation, a first resistor and a first capacitor connected in parallel relation having a predetermined time constant and connected to be traversed by current flowing through the current path of said signal translating stage; a junction transistor having base, emitter and collector electrodes; a second resistor connected in series relation with said first resistor; a second capacitor connected in parallel relation with said second resistor to provide a second time constant appreciably shorter than said predetermined time constant, whereby voltage across said capacitors occasioned by an increase in current through said current path of said signal translating stage in response to a received impulse noise is discharged across said second capacitor in an appreciably shorter time than across said first capacitor; means connecting the base and emitter electrodes of said transistor to said second capacitor; and automatic gain control output signal means for said automatic gain control circuit connected between the collector and emitter electrodes of said transistor.

11. An automatic gain control circuit for television receiving systems and the like subject to impulse noise comprising in combination: a first semi-conductor amplifier device having first, second, and third electrodes, means providing a signal input circuit connected between said first and second electrodes for controlling the current between said first and third electrodes; a first resistance-capacitance network having a predetermined time constant; a second resistance-capacitance network having a time constant appreciably shorter than said predetermined time constant; means connecting said first and second networks in series relation with said first and third electrodes; a second semi-conductor amplifier device having base, emitter, and collector electrodes; means connecting said second network in series relation between the base and emitter electrodes of said device for applying the voltage across said second network between said base and emitter electrodes; means providing an automatic gain control output circuit coupled with said collector electrode for developing an automatic gain control output signal; and means for applying said automatic gain control output signal to said receiving system to control the gain thereof.

12. In a television receiving system including a first semi-conductor device adapted as a synchronizing signal separator circuit and having a first resistance-capacitance network with a predetermined time constant in the emitter-collector current path of said device, an automatic gain control circuit comprising in combination: a second semiconductor device including first, second and third electrodes; a second resistance-capacitance network connected between said first and second electrodes; said second network providing a time constant appreciably shorter than said predetermined time constant and being serially connected with said first network to be traversed by the current through said first semi-conductor device, whereby a voltage developed across said networks occasioned by an increase in said emitter-collector current in response to received impulse noise is discharged across said second network in an appreciably shorter time than across said first network; and means providing an automatic gain control output circuit coupled between the third electrode and one of said first and second electrodes of said second semi-conductor device.

References Cited in the file of this patent

FOREIGN PATENTS 176,597 Austria ---------------- Nov. 10, 1953